United States Patent [19]
Walker

[11] Patent Number: 4,557,508
[45] Date of Patent: Dec. 10, 1985

[54] TUBULAR CONNECTOR

[75] Inventor: Stephen J. Walker, Houston, Tex.

[73] Assignee: Cameron Iron Works, Inc., Houston, Tex.

[21] Appl. No.: 599,656

[22] Filed: Apr. 12, 1984

[51] Int. Cl.⁴ .............................................. F16L 21/08
[52] U.S. Cl. ...................................... 285/84; 285/315; 285/321; 285/322
[58] Field of Search ....................... 285/84, 86, 81, 82, 285/322, 323, 321, 315, 316

[56] References Cited

U.S. PATENT DOCUMENTS

| | | | |
|---|---|---|---|
| 2,784,987 | 3/1957 | Corcoran | 285/82 |
| 4,362,326 | 12/1982 | Geppert | 285/321 X |
| 4,366,945 | 1/1983 | Blauenstein | 285/316 |
| 4,491,345 | 1/1985 | Regan | 285/315 X |
| 4,491,346 | 1/1985 | Walker | 285/315 X |

FOREIGN PATENT DOCUMENTS 281971  9/1970  U.S.S.R. ............................... 285/315

Primary Examiner—Dave W. Arola
Attorney, Agent, or Firm—Vinson & Elkins

[57] ABSTRACT

An improved tubular connector including a first tubular member, a second tubular member, said members having external grooves near their ends which are to be joined, a plurality of latching segments having internal projections adapted to engage in the grooves of both said first tubular member and said second tubular member and also having external tapered surfaces, an actuator ring having an internal tapered surface matching and engaging the external tapered surfaces of said latching segments, movement of the actuator ring in one direction wedging said segments into tight latching engagement with said grooves on said tubular members and movement in the other direction releasing said segments to allow them to disengage from said grooves on said tubular members, an external retaining groove in one of said tubular members, and a split ring positioned in said external retaining groove and engaging said actuator ring to exert a force thereon which retains it in each of its extreme positions.

2 Claims, 6 Drawing Figures

TUBULAR CONNECTOR

BACKGROUND

The connection of subsea tubular members, such as risers, requires that the connection not be released by pressure to which it is exposed. It is also necessary that the connection release when it is desired to be released.

In the past many connectors have relied upon the angle of taper between the locking dogs or ring and the actuator mechanism to be a self locking taper. This creates problems in that it relies upon the coefficient of friction remaining the same and the application of a lubricant may so change this coefficient that the taper no longer is a self locking taper.

The A. G. Ahlstone U.S. Pat. No. 3,321,217 discloses a subsea connector which is remotely actuated and relies upon a wedge ring to force locking dogs into engagement with grooves to complete the connection and relies on a self locking taper between the two to maintain the locked position.

The M. B. Jansen, Jr. U.S. Pat. No. 4,057,267 discloses a pipe connector which is stated to be particularly useful for connecting underwater riser sections and includes remotely actuated hydraulic means for moving locking dogs radially inward into locked position and a remotely actuated hydraulic means for moving a cam into position to lock the dogs and their actuator in locked position.

The K. C. Saliger et al. U.S. Pat. No. 4,222,592 discloses another type of connector for underwater members which includes an over-the-center toggle mechanism which is remotely actuated to move locking dogs into engagement with their grooves and the past-center position of the toggle mechanism resists unlatching of the dogs from their grooves.

The W. M. Taylor U.S. Pat. No. 3,986,729 discloses a connector suitable for underwater connection of two tubular members which wedges a locking ring into engagement to join the two members and includes a means to wedge the locking ring to release position when the wedging member is moved to release position.

Examples of the use of collet type of connectors for the connection of tubular members are shown in U.S. Pat. Nos. 4,265,470, 4,049,297 and 4,074,912. While these patents disclose connectors which are locked in their latched position none of them disclose any means for retaining the camming or wedging actuator member in both its latched position and its unlatched position.

SUMMARY

The improved connector of the present invention includes a first tubular member, a second tubular member, each of said tubular members having suitable external engaging means, a plurality of latching members having internal engaging means mating with the external engaging means on said tubular members and being normally in expanded position around the exterior of said tubular members out of engagement therewith and an external tapered surface, an actuating ring surrounding said latching members and having an internal tapered surface engaging the external taper of surface on said latching members so that movement of said actuating ring in one direction wedges said latching members into latching engagement with said tubular members and movement of said actuating ring in the other direction releases said latching members from latching engagement with said tubular members, and means for restraining movement of said actuating ring in both of its extreme positions.

An object of the present invention is to provide an improved tubular connector which is releasably locked in both its latched and unlatched position.

Another object is to provide an improved tubular connector suitable for use in subsea installations which ensures that it will remain latched or connected until positively and intentionally released.

A further object is to provide an improved tubular connector suitable for use in subsea installations which is mechanically retained in both its latched and unlatched positions until positively moved to the other position.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
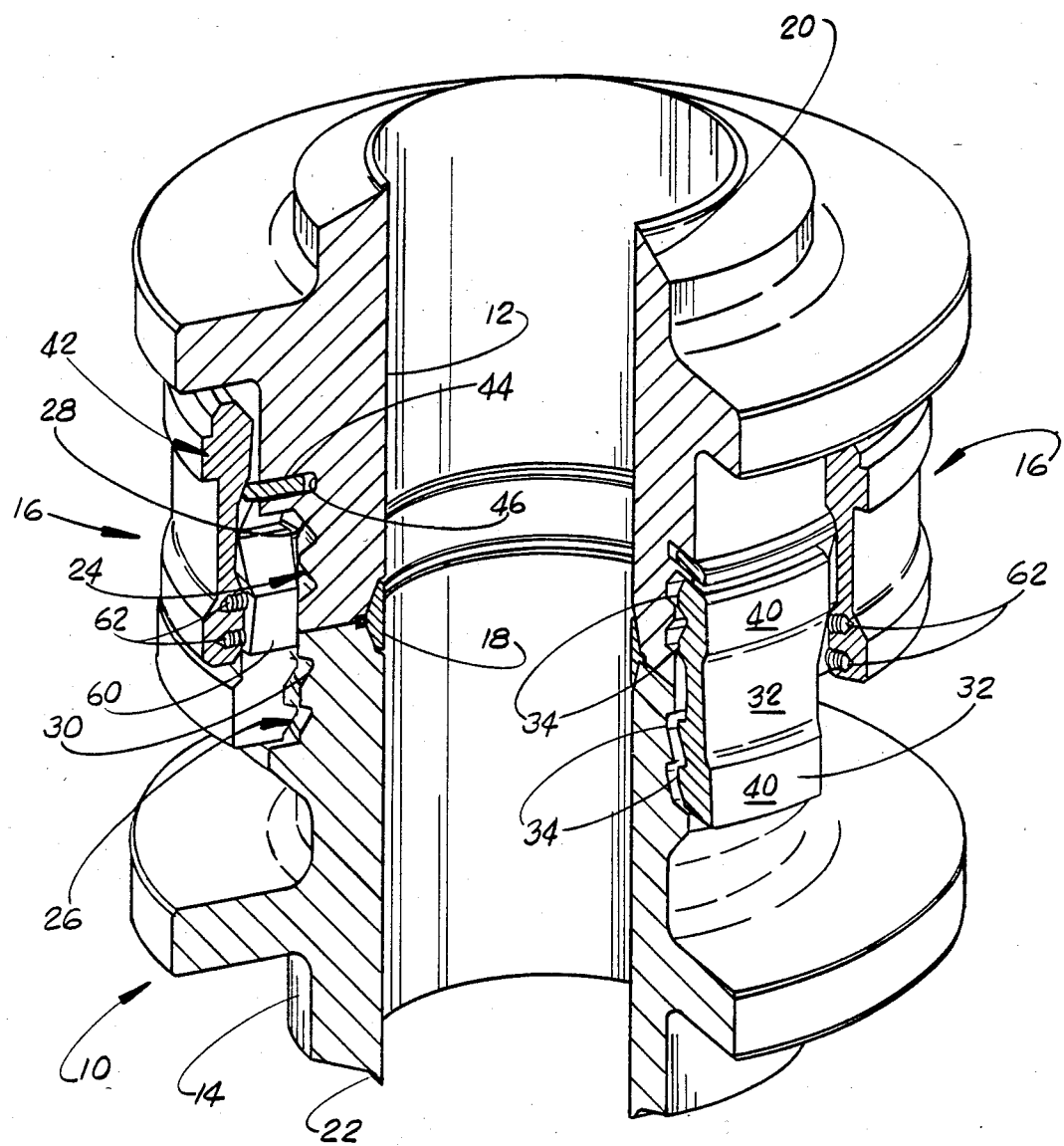
FIG. 1 is a perspective view of the improved connector with portions broken away to present details of structure and with the connector in its unlatched position.
Figure 2:
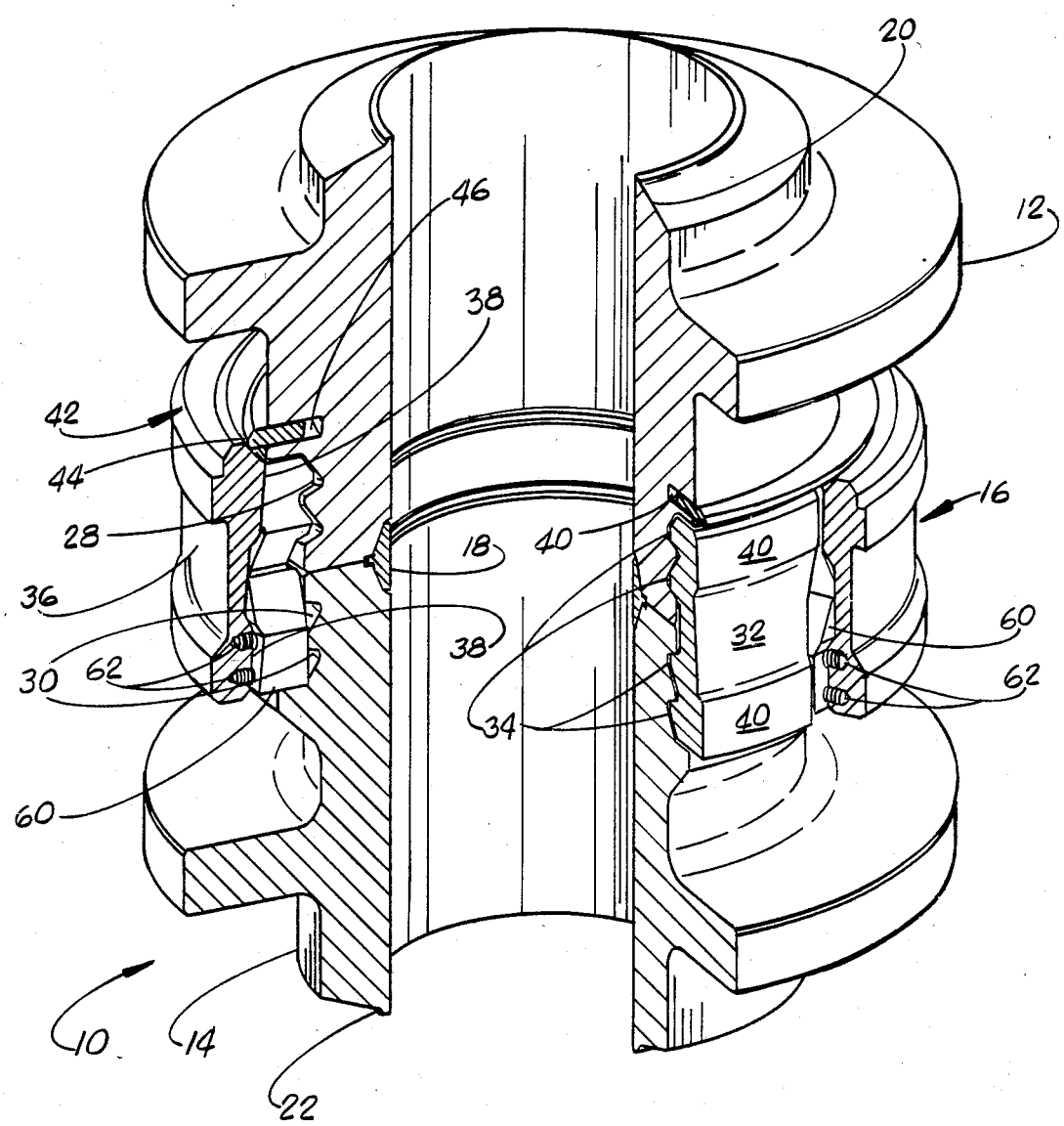
FIG. 2 is a view similar to FIG. 1 showing the connector in its latched position.

As shown in FIGS. 1 and 2, improved connector 10 includes first tubular member 12, second tubular means 14 and means 16 for positively connecting or latching said members together with seal ring 18 therebetween. Upper end 20 of first member 12 and lower end 22 of second member 14 are suitable prepared for welding the tube sections to the tubular members which connector 10 is to connect. First tubular member 12 includes means 24 surrounding its exterior for latching engagement and second tubular member 14 includes means 26 surrounding its exterior for latching engagement. As shown, means 24 includes grooves 28 and means 26 includes grooves 30.

Figure 3:
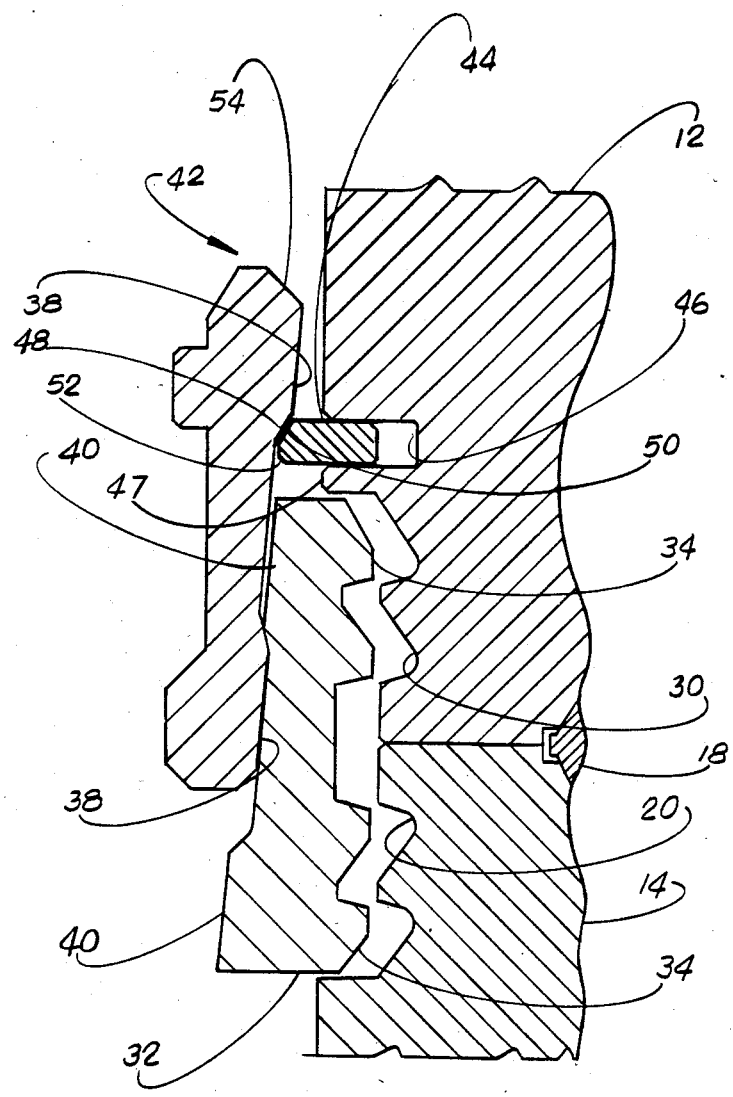
FIG. 3 is a partial sectional view of the latching mechanism of the present invention in its unlatched position.
Figure 4:
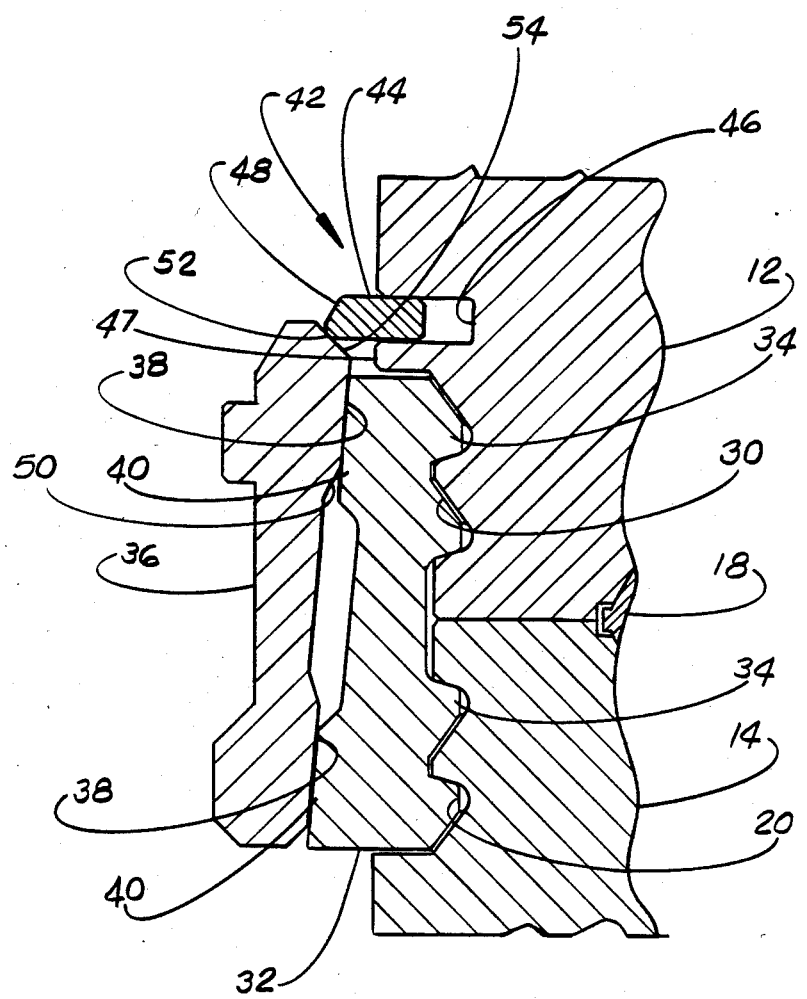
FIG. 4 is a view similar to FIG. 3 and showing the latching mechanism in its latched position.

Connecting or latching means 16 includes latching segments 32 which, when actuated to latching position as shown in FIG. 2, has its internal projections 34 in tight engagement with grooves 28 and 30 of members 12 and 14. Actuation of latching means 16 is accomplished by movement of latching actuator ring 36 in the downward direction as shown in FIGS. 3 and 4 so that its inner tapered surfaces 38 engage and wedge the outer tapered surfaces 40 on latching segments 32 to move segment projections 34 into engagement with grooves 28 and 30.

Latching means 16 includes retaining means 42 which functions to retain actuator ring 36 in both its latched and its unlatched positions. Retaining means 42 includes split ring 44 which is positioned in groove 46 in the exterior of member 12. As shown in FIG. 3, split ring 44 has its upper outer bevel 48 in engagement with inner taper 50 on actuator ring 36 to exert a force in the upward direction to retain actuator ring 36 in its unlatched position. As shown in FIG. 4, split ring 44 has its lower outer bevel 52 in engagement with inner taper 54 on actuator ring 36 to exert a force in the downward direction to retain actuator ring 36 in its latched position.

Figure 5:
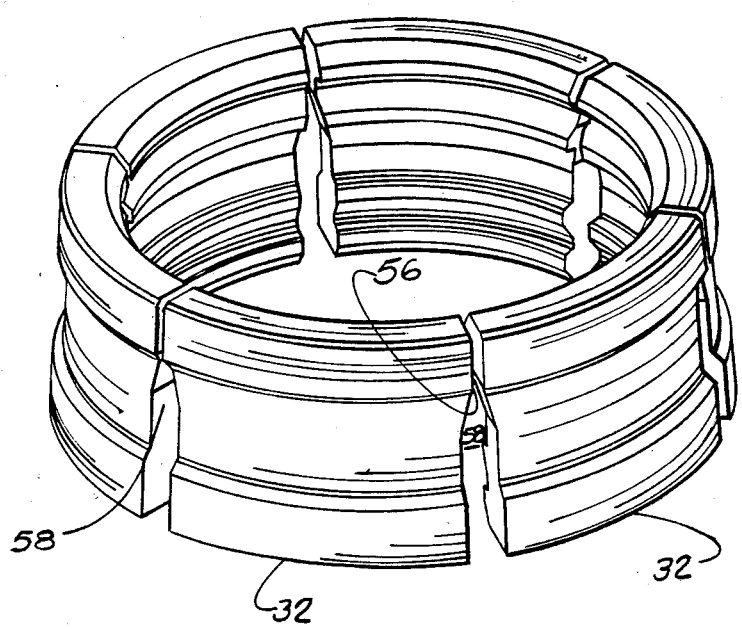
FIG. 5 is a perspective view of the latching segments.
Figure 6:
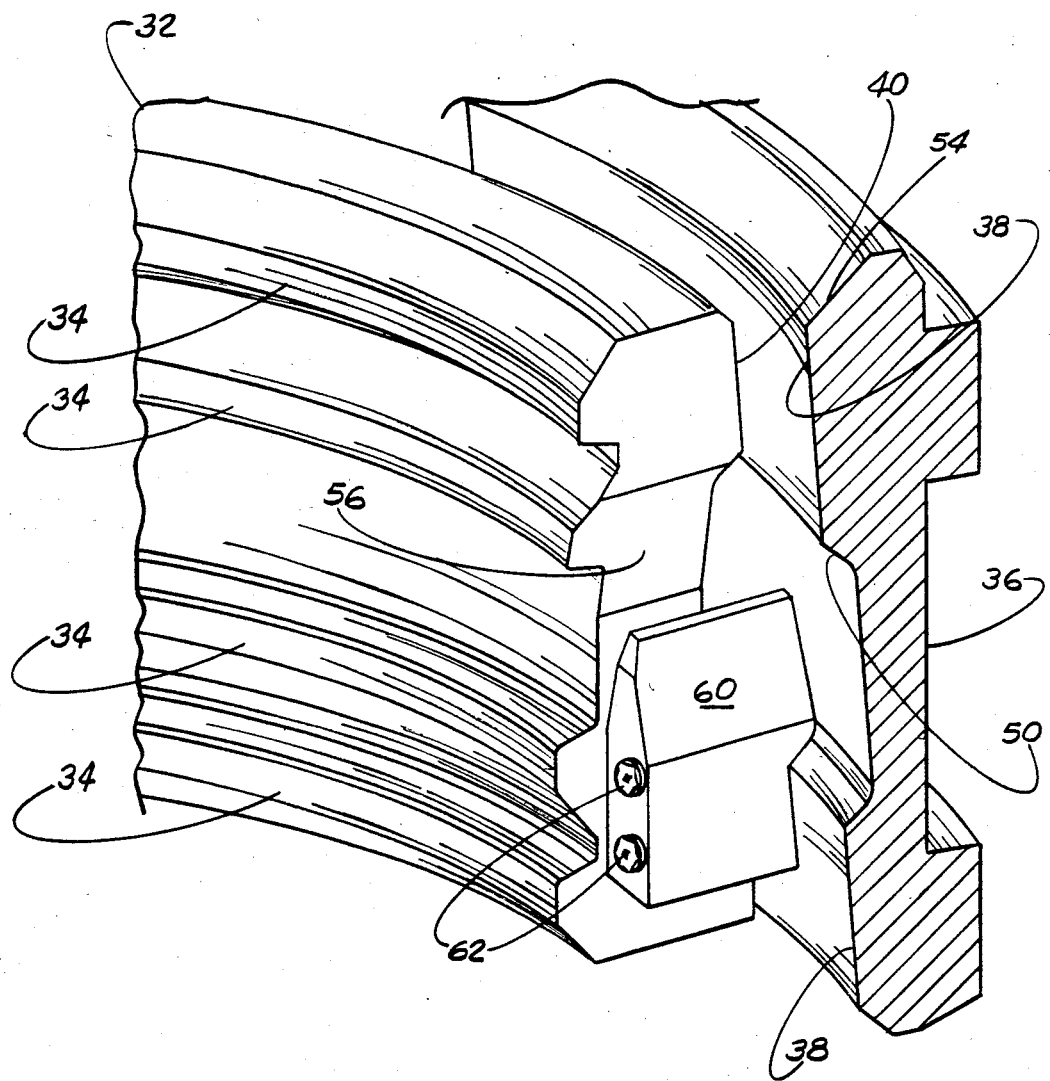
FIG. 6 is an enlarged partial perspective view of the interior of the latching segments and actuating ring to illustrate their coaction.

The edges of each of segments 32 include surfaces 56 which taper in a direction toward the adjacent segment in the upward direction. As best seen in FIG. 5, this provides space 58 between adjacent segments 32. Wedge blocks 60 are secured to the interior of actuator ring 36 by cap screws 62 and are adapted to be positioned in space 58 so that the upward movement of ring 36 causes wedge blocks 60 to exert forces on the edges in a tangential direction to force segments 32 into their unlatched position.

In the event that flange 47, which is on the lower side of groove 46, is too large to allow the insertion of snap ring 44 therein without damaging ring 44, flange 47 may be made separate from member 12 and threaded thereon after the installation of snap ring 44. It is suggested that suitable stops be provided to ensure that flange 47 is properly positioned and that it does not restrict the movement of snap ring 44.

The improved connector of the present invention is assembled and set in the running of the riser string. In the usual manner the lower member is supported by a spider in the rotary table with the remainder of the components being in position. A suitable actuating device is connected to the actuator ring to move it to the latching position. In disconnecting the latched connector, it is supported on the spider and the actuator ring is engaged and moved to unlatched position by the same device.

What is claimed is:

1. A tubular connector comprising
    a first tubular member having a plurality of external latching grooves around the exterior at a position near one end of said first tubular member,
    a second tubular member having a plurality of external latching grooves around the exterior at a position near one end of said second tubular member,
    a plurality of latching segments having internal projections spaced for latching engagement with the external grooves of said tubular members to latch said tubular members into latching engagement to each other, said latching segments having external tapered surfaces,
    an actuator ring positioned in surrounding relationship to said segments to retain said segments in position around said tubular members and having an internal tapered surface in engagement with the external tapered surfaces of said latching segments whereby movement of said actuator ring in one direction wedges said segments into latching engagement with said tubular members and movement of said actuator ring in the opposite direction releases said segments from latching engagement with said tubular members,
    one of said tubular members having an external locking groove spaced from its external latching grooves, and
    a split ring positioned in said locking groove and biased in the radial outward direction into engagement with said actuator ring to exert a force on said actuator ring to retain it against movement in both its latched position and its unlatched position,
    said split ring having a tapered outer surface which engages said actuator ring to restrain the movement releasing said segments,
    said actuator ring having a tapered inner surface which is engaged by said split ring to restrain wedging movement of said actuator ring.

2. A tubular connector according to claim 1 including means for engaging said segments during unlatching movement of said actuator ring to urge said segments into unlatched position.

* * * * *